United States Patent [19]
Kitano et al.

[11] 3,656,600
[45] Apr. 18, 1972

[54] INCHING CLUTCH WITH BRAKE AND ACCELERATION CONTROLS

[72] Inventors: Shin Kitano; Yutaka Momose; Kazuo Ishikawa; Takashi Hida, all of Kariya Japan

[73] Assignee: Aisin Seiki Kabushiki Kaisha, Kariya City, Japan

[22] Filed: May 5, 1970

[21] Appl. No.: 34,777

[30] Foreign Application Priority Data

May 7, 1969 Japan..................................44/36667
June 17, 1969 Japan..................................44/57166

[52] U.S. Cl..........................192/.055, 137/625.6, 192/.075, 192/13 R, 192/109 F
[51] Int. Cl. ....................................B60k 21/00, B60k 29/00
[58] Field of Search...................192/109 F, .055, .094, 13 R, 192/4 A, 4 R

[56] References Cited

UNITED STATES PATENTS

| 2,695,696 | 11/1954 | Iavelli | 192/109 F |
| 2,756,851 | 7/1956 | Collins | 192/109 F |
| 2,939,557 | 6/1960 | Dabich et al. | 192/109 F |
| 3,306,408 | 2/1967 | Kahle | 192/109 F |
| 3,527,328 | 9/1970 | Maurice | 192/109 F |

Primary Examiner—Benjamin W. Wyche
Attorney—Sughrue, Rothwell, Mion, Zinn & Macpeak

[57] ABSTRACT

This invention relates to a clutch oil pressure control mechanism of the wet type. The improvements comprise means provided for automatically causing the clutch engagement on-off control to respond to movements of a conventional accelerator pedal or brake pedal so as to easily obtain no clutch or half-clutch engagement in an easier way and for substantially obviating conventional clutch-engaging shocks.

4 Claims, 4 Drawing Figures

INCHING CLUTCH WITH BRAKE AND ACCELERATION CONTROLS

This invention relates generally to improvements in and relating to automotive and the like clutch mechanisms. More specifically, it relates to an oil pressure control mechanism adapted for automatic on-off control of clutch engagement.

It is frequently encountered with use of industrial vehicles, among others fork lifts, that the operator may be too tired by occupied jobs which require repeating clutch engagement and disengagement because a large number of shift change operations which must be carried out.

In the case of fork lifts, continued jobs must be made with the clutch kept in its semi-clutched state, resulting in a rapid wear on the clutch engaging surfaces when the clutch is of the dry type. Frequent exchange of clutch disks is necessary to make for the safe and satisfactory fork lift jobs.

It is therefore the main object of the present invention to provide a substantially improved clutch oil pressure control mechanism adapted for obviating the aforementioned various conventional drawbacks.

A further object is to provide a clutch oil pressure control mechanism of the above kind which utilizes the wet type clutch and the on-off control of the clutch engagement is carried out automatically in response to the movement of the accelerator pedal or brake pedal.

It is a still further object of the invention to provide a control mechanism of the above type wherein a no-clutch or half-clutch engagement position can be more easily realized than by conventional structures.

A still further object is to provide a control mechanism of the above kind wherein otherwise appearing clutch-engaging shocks may be substantially obviated.

These and further objects, features and advantages of the invention will become more apparent when reading the following detailed description of the invention by reference to the accompanying drawings illustrative of several preferred embodiments of the invention.

Figure 1:
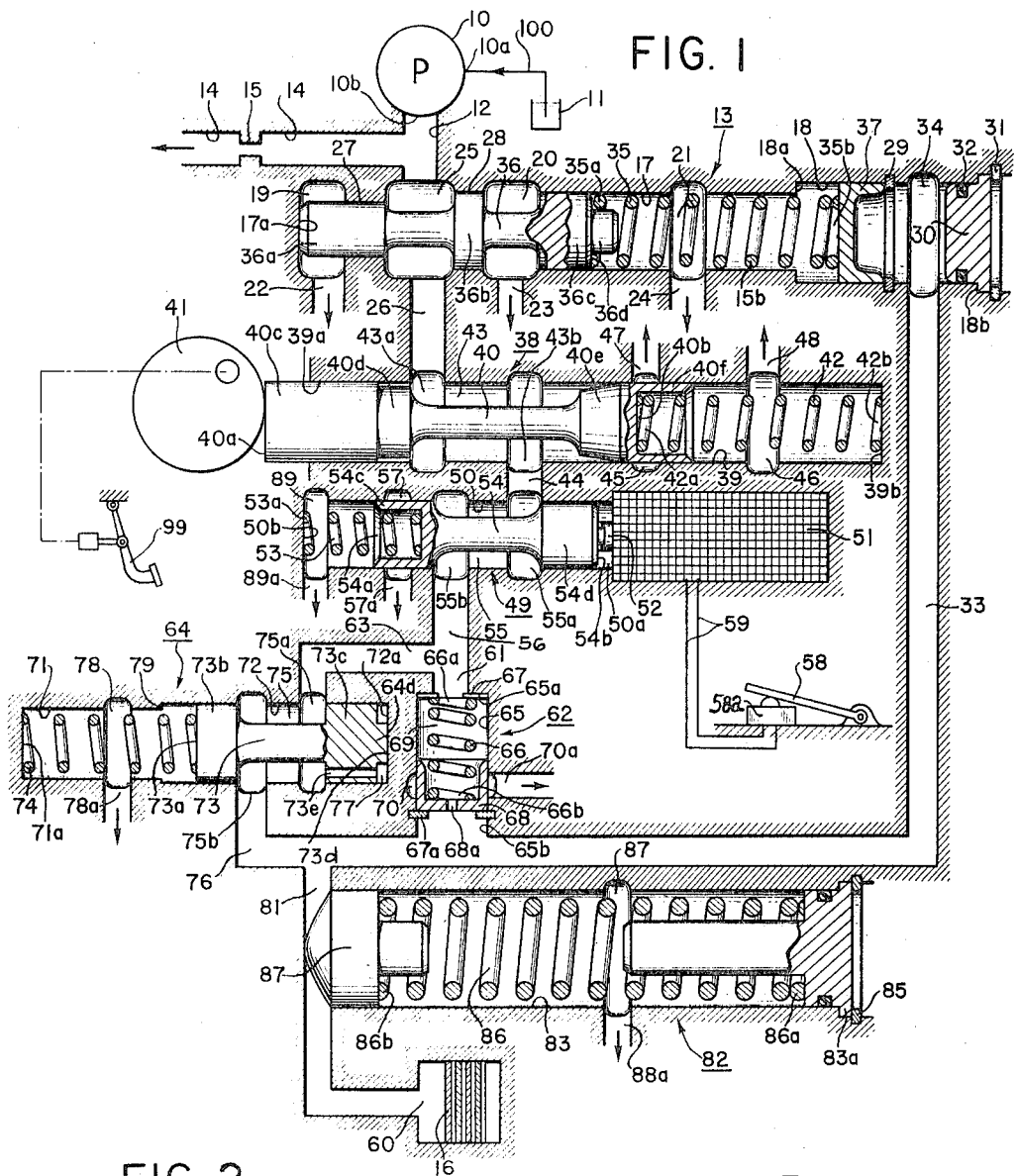
FIG. 1 is a schematic and substantially sectional view of the arrangement for the oil pressure control of an automotive clutch unit according to the first embodiment of the invention.

Referring now to the accompanying drawings, especially FIG. 1 thereof, the numeral 10 represents a pump only schematically shown, having a suction inlet 10a which is connected through a suction piping 100 to an oil reservoir 11 and a delivery output 10b which is kept in fluid communication with a delivery duct 12 which connected fluidically to a regulator valve assembly generally shown at 13, or more specifically an oil reception chamber 25 thereof. Thus, it will be seen that when the oil pump 10 is operated, oil is sucked by the latter from the reservoir 11 to the reception chamber 25 of the regulator valve assembly 13.

From the delivery duct 12, a duct 14 is branched off and leads through a flow-reducing orifice 15 formed therein to a clutch assembly to lubricate and cool its clutch plates, as will be more fully described hereinafter in connection with FIG. 2.

Regulator valve assembly 13 comprises a small diameter bore 17 and a large diameter bore 18 arranged coaxially with each other and thus forming in combination a stepped common valve bore, the former bore 17 being formed with drain chambers 19, 20, and 21 which are formed in turn with drain ports 22, 23, and 24, respectively. The aforementioned chamber 25 is positioned at an intermediate point between the chambers 19 and 20, as shown, and kept in fluid communication with a communication duct 26.

A spool valve member 36 is slidably mounted within the bore 17, the latter being formed with a first concentric land 27 which has a smaller inside diameter than that of corresponding bore 17 and land 28 and substantially equal to the outside diameter of valve land 36a and extends between the chambers 19 and 25. The valve bore is further formed with a second concentric land 28 which has a substantially equal inside diameter as the outside diameter of a valve land 36b and bore 17 and extends between the chambers 20 and 25.

A snap ring 29 is firmly held in the wall of the large diameter bore element 18 at an intermediate point between both extremities thereof, said bore element 18 being kept at its inner end 18a in fluid communication with the small diameter bore element 17, while the opposite or outer end 18b is closed by a plug 30 which is held firmly in position by means of a snap ring 31. The plug is provided with a sealing ring 32 for the prevention of oil leakage through unavoidable small gaps formed between the plug and the related wall part of the bore element.

A chamber 34 is formed at an intermediate point between snap ring 29 and plug 30 for establishing fluid communication with a connection duct 33. Between the inner end 36d, having a reduced cross-section as shown, of the spool member 36, and the inner end of slidable piston 37, there is provided under compression a compression coil spring 35, being called the regulator valve spring, which urges with its inner end 35a resiliently the spool 36 in the left-hand direction in FIG. 1 and thus the outer end of land 36a thereof abutting against the outer end wall 17a of the elongated valve bore 17–18. The opposite or outer end of the spring, abutting upon the piston 37 is shown at 35b. Normally, this piston 37 abuts against snap spring 29.

Spool valve member 36 comprises first spool land 36a adapted for sliding movement within the bore part defined by the first bore land 27; second spool land 36b mounted slidably within the bore part defined by the second bore land 28; and third land 36c adapted for sliding within the bore element 17.

When pressure oil is conveyed from the pump 10 through duct 12 to reception chamber 25 of the regulator valve 13, the oil pressure acts upon the spool valve 36, and the latter is hydraulically urged to slide in the right-hand direction in FIG. 1 because the diametral difference between lands 36b and 36a and against the spring force at 35, thereby the chamber 25 being brought into fluid communication with the drain chamber 20 and excess oil being discharged through the related drain opening 23. In this way, the oil pressure prevailing in the chamber 25 is regulated to a certain value in response to the now established load on the spring 35. This spring load is determined by the displacement of piston 37 which is urged hydraulically by being subjected to oil pressure supplied from a hydraulic circuit to be described and through said duct 33 to the related chamber 34. The oil pressure supplied to the reception chamber 25 is conveyed through connection duct 26 kept in communication therewith to reception chamber 43a of an inching valve unit generally shown at 38.

The inching valve unit 38 is provided with an elongated bore 39 open at one end 39a thereof. Within this bore 39, a spool valve generally shown at 40 is slidably mounted and one end 40a is kept in contact with a cam 41 which is mounted rotatably and connected with a conventional foot-operated brake pedal 99 for rotation with movement thereof, although not specifically shown for simplicity. Outer end 40a of the valve spool 40 is kept in sliding contact with the rotatable cam, while the opposite or inner end 40b of the spool is kept in pressure contact with the inner end 42a of an inching valve spring 42, the outer end 42b of the latter abutting against the closed end wall 39b of said bore 39. The spool valve 40 comprises somewhat elongated land 40c which is slidable at the bore end 39a; a reduced step part 40d; a truncated cone part 40e; and an end cylindrical part 40f forming a land which is slidable in the bore 39. There is a liquid chamber 43 which is formed between the spool 40 and the wall of bore 39 and provided in turn with an oil inlet 43a and an outlet 43b. The inlet 43a is kept in fluid communication with said duct 26 and the outlet 43b communicates with a connection duct 44. The bore 39 is formed with drain chambers 45 and 46 which are provided in turn with drain ports 47 and 48, respectively.

With the brake, not shown, kept in its non-operating conditions, pressure oil supplied to said chamber 43 will be conveyed through said outlet 43b to duct 44.

When the brake pedal 99 is depressed on the other hand, motion is transmitted therefrom to the cam 41 which is thus rotated and the valve spool 40 is moved in the right-hand direction in FIG. 1 against the action of spring 42 until the reduced and stepped cylindrical portion 40d covers gradually the supply opening 43a which is thus substantially closed to provide a throttling means. At the same time, the taper part 40e is brought to such a position that a fluid communication between the chamber 43 and the drain port 47 of chamber 45, thus the oil pressure prevailing in the chamber 43 being dropped. In this way, a semi-clutching condition is realized during the idle stroke of the brake pedal.

Pressure oil is conveyed from inching valve 38 through said duct 44 to a cut-off valve unit 49. This unit 49 is formed with a bore 50 open at its one end 50a. There is provided a solenoid 51 adjacent to and concentrically with said opened bore end 50a an electromagnetic solenoid 51 which is provided coaxially and slidably with an armature in the form of a push rod 52. The numeral 53 represents a cut-off valve spring which is mounted within the bore 50. The outer end 53a of said spring 53 abuts against the bore end wall 50b, while the opposite or inner end 53b is kept in pressure engagement with the outer end 54a of valve spool 54 which is slidably mounted in the bore 50. Under the influence of cut-off valve spring 53, the inner end 54b of valve spool 54 is kept in pressure engagement with the solenoid armature 52. Valve spool 54 is formed with two lands 54c and 54d which have proper dimension so as to be slidable within the bore 50. A liquid chamber 55 is formed between valve spool 54, and base 50, said chamber being provided with supply port 55a kept in fluid communication with 44; and further with an outlet port 55b communicating with duct 56. Drain chambers 57 and 89 are provided in the bore and formed with drain ports 57a and 89a, respectively. Solenoid coil 51 is arranged to be energized by supply of current from an electric circuit 59 which is provided with a current source, preferably a vehicle battery, not shown, and arranged operable by closure of attached switch 58a when a conventional accelerator pedal 58 is kept in its idle position; this pedal may be replaced with equal results by a conventional shift bar, not shown, when necessary. In other words, solenoid 51 is kept energized with the accelerator pedal 58 positioned in its released state. With energization of solenoid 51, the armature 52 is brought into actuation to advance, thereby valve spool 54 being displaced against the spring action at 53. In this way, valve land 54d is brought into such position that the hitherto established fluid communication between ducts 44 and 46 is positively interrupted, while duct 56 is brought into communication with the drain port 57a of drain chamber 57, resulting in the oil pressure in clutch chamber 60 reduced to nil and the clutch being brought into disengagement.

When the accelerator pedal 58 is depressed, the solenoid 51 is de-energized and the armature or solenoid push rod 52 will return to its original position by the urging action exerted thereupon through the intermediary of valve spool 54 by cut-off valve spring 53. Thus, the fluid communication between ducts 44 and 56 is recovered.

In this way, oil pressure prevailing within clutch chamber 60 is elevated and the clutch is brought into re-engagement.

Oil pressure supplied from cut-off valve 49 is conveyed through ducts 56 and 61 to orifice valve 62. On the other hand, oil pressure is conveyed from said duct 56 through duct 63 to a quick supply valve 64.

Orifice valve 62 is provided with a bore 65 which is kept in fluid communication at its both ends with ducts 61 and 33, respectively.

The numeral 66 represents an orifice valve spring mounted in the bore 65; the upper end 66a abuts through a seat ring 67 against the shouldered upper end 65a of said bore, while the lower end 66b abuts through a piston 68 against a snap spring 67a held firmly in position in the wall defining said bore 65. The piston 68 is formed with a concentric orifice opening 68a.

A liquid chamber 69 is defined by the bore wall 65 and said piston 68 and communicates fluidically with duct 61, on the one hand, and through the orifice 68a with said duct 33. A drain chamber 70 is formed within said bore 61 and provided in turn with a drain port 70a. Pressure oil supplied from duct 61 to said chamber 69 is conveyed through the orifice 68a to said duct 33.

When the brake pedal 99 is depressed or the accelerator pedal 58 is released from foot pressure for disengaging the clutch, the aforementioned hydraulic circuit is interrupted by the valve spool 54 and then brought into fluid communication with said drain port, thus the oil pressure being caused to drop.

When the pressure oil in the chamber 69 is drained in this way, piston 68 will be moved against the action of orifice valve spring 66, thus the drain port 70a of drain chamber 70 is communicated with duct 33. Oil pressure in the chamber 60 is thus rapidly released and the clutch is brought into its positively released state.

Quick supply valve 64 is provided with an elongated and stepped bore comprising a small diameter bore 71 and a large diameter bore 72. A valve spool 73 is slidably mounted in the large diameter bore 72, a compression coil spring 74 being inserted between one end 73a of said valve spool and an end wall 71a of said small diameter bore 71. Under the action of quick supply valve spring 74, the valve spool 73 is kept in abutment with the opposite end wall at 72a of said bore 72, the spool 73 being formed with two lands 73b and 73c for making the spool slidable along the bore 72. The land 73c is positioned axially at a certain predetermined distance from one end 73d of the spool 73. A chamber 75 is defined by the bore wall 72 and said spool lands 73b and 73c, and formed in turn with a supply port 75a kept in fluid communication with duct 63 and with an outlet port 75b communicating with duct 76. A liquid chamber 77 is defined at one end 72a of large diameter bore 72 by the end 73d of valve spool 73 and said land 73c. A communication duct 73e is bored through the land 73c in the axial direction thereof for establishing fluid communication between chambers 75 and 77.

A drain chamber 78 is formed in the small diameter bore 71 and formed with a drain port 78a. Oil pressure is conveyed from duct 63 to chamber 75, and thence through communication duct 73e to chamber 77. When oil pressure in the chamber 75 exceeds a certain predetermined value, the hydraulically urged valve spool 73 moves against the action of quick supply valve spring 74 until it will be brought into abutment with a shoulder 79 which defines the critical plane between the bore elements 71 and 72. At this stage, the land 73c of valve spool 73 is kept in such a position that it interrupts the hitherto established fluid communication between the ducts 63 and 76.

Figure 2:
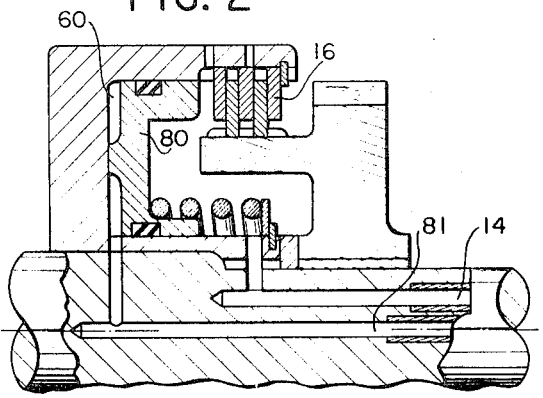
FIG. 2 is an enlarged substantially sectional view of the clutch unit shown in FIG. 1.

As seen from FIGS. 1 and 2 in combination, the hydraulic pressure conveyed through the duct 81 is conveyed to the clutch chamber 60 and urges the piston 80 to move towards clutch plates package 16. It should be noted that the dimension and arrangement of the related parts are so selected that the fluid connection between the ducts 63 and 76 is maintained and thus a larger quantity of pressure oil is supplied to the clutch chamber 60, until directly before the engagement of clutch piston 80 with plates package 16. Upon said communication, hydraulic engagement between 63 and 76 is interrupted by valve sleeve 73 of the quick supply valve unit 64 and the supply of pressure oil to duct 81 is carried out only through orifice valve 62, thereby otherwise possible shock at the engagement of the clutch can be substantially obviated.

The pressure oil supplied through orifice valve 62 and quick supply valve 64, when the latter is in its operating condition, is conveyed from duct 76 through duct 33 to chamber 34 so that the piston 37 is displaced against the action of regulator valve spring 35. In this way, the load on the spring 35 is gradually varied so as to adjust the line pressure gradually to a higher value.

The supply pressure is conveyed through duct 81 and acts upon accumulator piston 87 which is slidably mounted in one end of a bore 83, while in the opposite end of the latter, a plug 84 is sealingly received and abuts against a snap ring 85 held firmly in position at the bore end 83a. An elongated compression spring 86 is inserted in the bore, one end 86a of said spring abutting against said plug 84 and the opposite end 86b being kept in pressure engagement with accumulator piston 87 which abuts thus under pressure against the wall defining the duct 81. The bore 83 is formed with a drain chamber 88 which is formed with a drain port 88a.

The accumulator piston 87 is designed and arranged so that upon actuation of the quick supply valve 64 hydraulically by the supply oil pressure, it moves towards the right against the action of spring 86. Therefore, the pressure oil supplied from the accumulator 82 is conveyed through duct 81 to clutch chamber 60, as was referred to hereinabove, so as to actuate the clutch piston 80 for bringing the clutch into its coupled condition.

In the following, a general description of the operation of the clutch oil pressure control arrangement will be given.

When the drive engine, not shown, of the vehicle is started, the oil pump 10 mechnically coupled with the drive engine as done conventionally, although not shown, delivers pressure oil which is utilized for lubricating and cooling the clutch as conventionally done, said oil being conveyed to the control oil circuit and subjected at first to pressure adjustment in the regulator valve 13, thence to the inching valve 38. When the brake pedal 99 is depressed to a full degree under these operating conditions, valve spool 40 is displaced against the action of inching valve spring 42, resulting in the supply pressure oil being drained off at 47. Therefore, no oil pressure is accumulated in the clutch chamber 60 and the clutch is brought into its complete disengagement.

With the brake pedal 99 in its released condition and simultaneously, the accelerator 50 is also in its released condition, the thus energized solenoid 51 of cut-off valve 49 will actuate its push-rod type armature 52 so as to move the valve spool 54 against the action of cut-off valve spring 53 and the supply oil pressure is drained off at 57a. Thus, the clutch is again brought into its uncoupled condition.

In the case of a starting period, when the starting is required gradually to perform or a half-clutch operation to be brought about, the brake pedal is gradually released and the accelerator pedal 58 is depressed gradually. In this case, the supply pressure oil is throttled to a substantial degree by the reduced diameter land 40d of valve spool 40 of inching valve 38 and then subjected to a pressure reduction in the accumulator 82. Therefore, oil pressure in the circuit 33 is reduced and the oil pressure rise in the valve 13 is retarded. Thus, oil pressure in the clutch chamber 60 will rise gradually and the vehicle starts again gradually.

Figure 3:
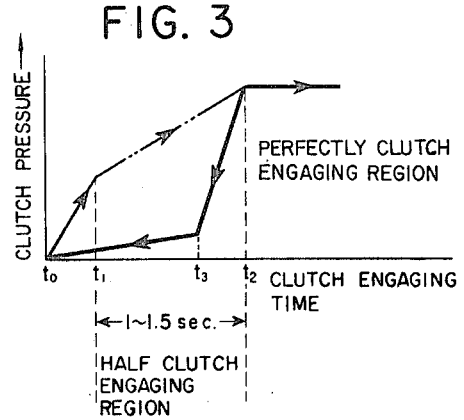
FIG. 3 is an explanatory chart of the clutch pressure plotted against the clutch engagement period realizable, by way of example, with use of the clutch pressure control arrangement substantially shown in FIG. 1.

When it is desired to make a rapid start of the vehicle, the brake pedal 99 is quickly released and the accelerator pedal is depressed suddenly. The supply pressure is supplied through said quick supply valve 64 to the clutch chamber 60 until directly before the engagement of the clutch plates 60. Then, the valve spool 73 of quick supply valve 64 is hydraulically displaced to such a position that the hitherto established fluid communication is thereby interrupted, resulting in the throttling effect to the pressure oil at the orifice valve 62 and the oil pressure in accumulator 81. In this way, oil pressure in the circuit 33 is reduced and the rise of oil pressure at regulator 13 is retarded. Rise of pressure in clutch chamber 60 is retarded and the relation between the oil pressure in clutch chamber 60 and the clutch-engaging time will become as shown in FIG. 3 by way of example. As seen from this chart, the normally appearing shock occurs at the clutch-engaging instance. Also in the case of shift change operation, it is only necessary that the accelerator pedal 58 be once released and upon bringing about a shift, the accelerator pedal 58 is depressed.

As will be seen from the foregoing, the clutch oil pressure control arrangement according to this invention utilizes a wet type clutch and in the case of the on-off control operation thereof, the clutch is automatically brought into engagement in response to the movement of accelerator pedal or brake pedal for the purpose of reducing the necessary time period from the initial indication point of a clutch-engaging operation to the comencement of the clutch engagement, as short as possible. In addition thereto, the necessary time period from initial clutch engagement to full clutch engagement can be, according to our experiment, set to an ideal short length such as, preferably, 1.0–1.5 seconds for industrial and personel vehicles.

It was further found that clutch engagement shocks conventionally appearing at the start of the vehicle or in a shift change operation can be substantially obviated.

Figure 4:
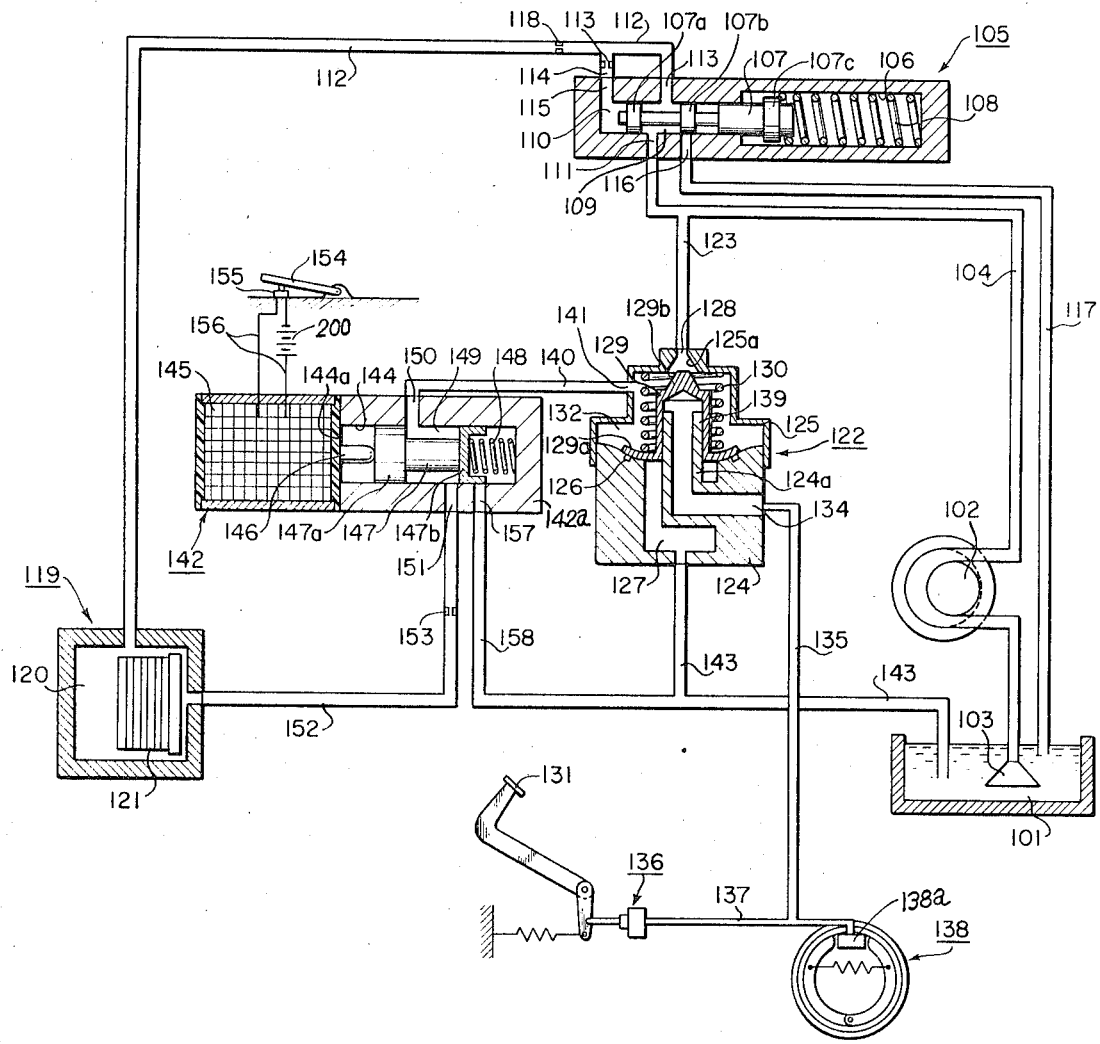
FIG. 4 is a schematic explanatory view of the second embodiment of the present invention.

Next, referring to FIG. 4, a second embodiment will be described in detail.

The numeral 101 denotes an oil reservoir and 102 a pump which is mechanically connected with a drive engine of an automotive vehicle, although not specifically shown in the drawing for simplicity.

The pump 102, shown only in a highly simplified schematic way, is inserted in a piping 104 and arranged to suck oil therethrough from said reservoir 101 through a suction strainer 103 which is attached to the lower end of said piping and immersed in a pool of oil contained in the reservoir.

A regulator valve unit 105 is formed with an elongated bore 106 in which a regulator valve member 107 is slidably mounted and urged by a return spring 108 inserted in said bore. Regulator valve member 107 is formed with three lands 107a, 107b, and 107c, said return spring abutting against the last land 107c with its inner end and kept in pressure engagement with the right-hand end wall of said bore 106 with its opposite or outer end. A first liquid chamber 109 is formed between the lands 107a and 107b and within said bore 106, and a second chamber 110 is formed at the left-hand end of said bore 106 and defined by the corresponding bore end wall and the first valve land 107a. Chamber 109 is formed with an inlet port 111 which is kept in fluid communication with piping 104 for receiving pressure oil delivered from pump 102, and with an outlet port 113 kept in fluid communication with a piping 112 which leads to a chamber 120 formed in a clutch operator generally shown at 119. The chamber 110 is formed further with a port 115 which is connected with said piping 112 through a short connection pipe 114 formed therein with an orifice 113.

The bore 106 is formed further with a drain port 116 which is connected with a drain piping 117 leading to oil reservoir 101. The piping 112 has formed therein an orifice 118 at an intermediate point between the connection pipe 114 and the unit 119 which is fitted therein with clutch plates package 121, thereby the clutch plates consisting the package 121 being always kept in optimally lubricated condition.

From oil feed piping 104, a branch pipe 123 is connected to an inching valve unit generally shown at 122 which comprises a valve body 124 fixedly attached to a valve casing 125.

On the upper surface of the body 124, an inching valve member 129 is positioned under pressure and sealingly therewith with its bottom flange 129a by means of a sealing ring 126 made of rubber or the like material and serving as a valve seat, the main body of said valve 129 being slidably positioned on the outer peripheral surface of a tube-like projection 124a made integral with the valve body 124.

A cone seat 125a is formed in the valve case 125, said seat being formed with an opening 128 which is kept in fluid communication with the communication pipe 123. A cone-shaped valve land 129b is formed on the end of valve 129 and engages with cone seat 125a. The main body of the inching valve 129 is made into substantially a cylindrical cup around which there is provided a coil spring 130 tensioned between the valve casing 125 and the valve flange 129a.

With the brake pedal 131 kept in its released condition, the inching valve 129 is kept in the position shown, thus a liquid chamber 132 formed within the valve is interrupted from fluid communication with a duct 127 formed through the valve body 124. Under these conditions, however, the valve proper at 129b formed on top end of the member 129 defines a valve gap between the inching valve and its seat, thus said chamber 132 being is in fluid communication with the pipe 123 through valve opening 128.

The interior space of inching valve element 129b is kept in fluid communication through a duct 134 and with a hydraulic brake pressure piping 135, the latter being fluidically connected with a piping 137 which extends from the outlet of a conventional master cylinder 136 to a wheel cylinder 138a adapted for performing a wheel braking at 138 as conventionally.

Numeral 140 represents a piping which extends from a port 141 formed through the wall of valve housing 125 and kept in fluid communication with the interior chamber 132, to a port 150 formed through the housing 142a of a cut-off valve unit 142.

A pipe 143 connects the duct 127 with oil reservoir 101. The cut-off valve unit 142 is formed with a bore 144 having an open end as shown at 144a. This open bore end 144a is, however, sealedly closed by an electromagnetic solenoid 145 which is provided with a centrally and axially arranged armature in the form of push rod 146.

A cut-off valve proper 147 is slidably mounted in the bore 144, said valve proper having two lands 147a and 147b. A return coil spring 148 is inserted in the right-hand bore end for urging the valve proper 147 against the push rod 146.

A liquid chamber 149 is formed between the lands 147a and 147b and within the bore 144 and kept in communication through a port 150 with said piping 140, on the one hand; and through an outlet port 151 with a piping 152 leading to the clutch chamber 120. An orifice 153 is provided in the piping 152 for the adjustment of oil flow therethrough.

Solenoid 145 is connected to leads 156 fitted with battery 200 and an on-off control switch 155, the latter being arranged to be actuated upon by a conventional automotive throttle pedal 154. This electric circuit 156 is so arranged that when the pedal 154 is kept in its released position, switch 155 is brought into its operating position so as to energize the solenoid.

With the solenoid 145 thus energized, the push-rod 146 is moved inwards for urging the cut-off valve proper 147 to move to the right against the action of return spring 148. By this operation, the land 147a of the valve proper 147 is brought to a position wherein the discharge port 150 is closed. On the other hand, valve end 147b recedes from the shown position covering the drain port 157, thereby the chamber 149 being brought into fluid communication with drain piping 158 which is fluidically connected with said drain piping 143 coming from the inching valve.

The operation of the above clutch oil pressure control arrangement is as follows:

When the automotive drive engine is brought into starting and the pump 102 is operated, oil is sucked from oil reservoir 101 through strainer 103 and delivered to a piping 104, thence to chamber 109 of regulator valve 105. The thus supplied pressure oil is conveyed from chamber 109 to piping 112. Part of this pressure oil is then subjected to a flow control action at the orifice 118, and then conveyed to chamber 120 of clutch actuating device 119 for lubricating and cooling clutch plates 121 in the clutch chamber 120. Another part of the pressure oil passes orifice 113 in connection pipe 114 to chamber 110 so as to displace the regulator valve proper 107 against the action of spring 108.

With the displacement of regulator valve 107, a part of pressure oil is discharged from drain port 116 for attaining a predetermined pressure level.

The drain oil discharged from port 116 is conveyed through piping 117 to oil reservoir 101. On the other hand, the pressure-regulated oil at the regulator valve unit 105 is conveyed through a branch pipe 123 to chamber 132 of inching valve 122 which is adapted for actuation in response to the brake oil pressure; thence through piping 140 to cut-off unit 142.

The supply pressure oil passed through the inching valve 122 is conveyed through piping 140 to the chamber 149 of oil pressure cut-off valve 142.

When, under these conditions, the throttle pedal 154 is depressed, the switch 155 is broken and the supply pressure oil in chamber 149 of cut-off valve unit 142 is conveyed into piping 152 and flows through orifice 153 to the chamber 120 of clutch actuator 119, thereby bringing the clutch into it actuating state.

When brake pedal 131 is depressed at this stage, brake pressure oil is delivered, as conventionally, from master cylinder 136 through piping 137 to wheel cylinder 138a of the wheel brake 138, on the one hand, and through brake pressure oil supply piping 135 and duct 134 to the interior space of inching valve proper 124. On account of the presence of a pressure difference between the spring pressure at 130 added with the regulated oil pressure at regulator 105 acting upon the top working surface of the inching valve 129, on the one hand, and the hydraulic brake pressure supplied to the interior space of the inching valve proper, on the other hand, and when the latter or brake pressure is higher, the inching valve 129 is moved upwards from contacting position with the valve seat 126, thereby said chamber 132 is brought into communication with duct 127.

The pressure-adjusted oil pressure to a certain constant value and prevailing in chamber 132 is conveyed through drain pipe 143 back to oil reservoir 101, and at the same time, the valve head 129b of inching valve 129 will occupy a nearer position to its valve seat 125a so as to provide a kind of orifice in effect. In this way, the pressure oil supplied to clutch chamber 120 of clutch actuator 119 will be throttled. With this intermediate position of the inching valve proper in advance of engagement thereof with the valve seat and with the throttle pedal 154 kept in its depressed position, a semi-clutched position is realized and thus the vehicle can be inchingly driven, regardless of the engine revolutional speed.

With the brake pedal 131 positioned at its fully depressed position, the inching valve head 129b is brought into full contact with the valve seat 125a. In this way, the fluid communication between the pipe 123 and the chamber 132 is interrupted, while the piping 140 and the drain pipe 143 are brought into fluid communication with each other. Therefore, the clutch plates package 121 in the clutch actuator 119 is brought into its uncoupled position.

On the contrary, when the throttle pedal 154 is released, the switch 155 is actuated to energize the solenoid 145 for advancing the push rod 146. In this way, cut-off valve proper 147 is displaced against the action of snap ring. Then, the hitherto established interruption of fluid communication between chamber 149 and piping 158 is broken. Fluid communication between piping 152 and drain piping 158 is also established. Clutch plates 121 are brought into its non-engaging state.

In the second embodiment so far shown and described, the inching valve unit is provided with a valve member having valving means at its both ends so that no appreciable difference in sliding resistance can be encountered by application of lateral forces. The clutch actuator can be positively fed with an oil pressure in response to the stroke of the brake pedal; thus the driver can feel favorable and pleasant braking foot touch.

The embodiments of the invention in which an exclusive property or privilege is claimed are as follows:

1. A clutch oil pressure control arrangement, comprising in combination:
    a. an oil pressure supply source;
    b. a clutch actuating means adapted for receiving oil pressure from said source and being actuated thereby;

c. oil passage means adapted for establishing fluid communication between said source and said clutch actuating means;
d. an oil pressure regulator valve means provided in said passage means for adjustment of oil pressure being conveyed to said clutch actuator;
e. an inching valve means provided in said passage means between said regulator valve means and said clutch actuating means for throttling the oil pressure regulated by said regulator valve means, said inching valve means operatively connected to a brake pedal and responsive to the degree of actuation of said brake pedal; and
f. a cut-off valve means provided in said passage means between said oil pressure regulator valve means and said clutch actuating means, said cut-off valve means being operatively connected to an engine accelerator pedal for on-off control of the oil pressure in said passage means and in response to the degree of actuation of said accelerator pedal.

2. A clutch oil pressure control arrangement as claimed in claim 1 further comprising:
a. an orifice valve means provided in said passage means between said cut-off valve means and said clutch actuating means, said orifice valve means having an orifice therethrough for conveying oil pressure through said orifice valve means to said clutch actuating means when oil pressure at the side of said cut-off valve means is higher than oil pressure at the side of said clutch actuating means and adapted for draining the oil pressure at the side of said clutch actuating means when the oil pressure prevailing at the side of said clutch actuating means is higher than the oil pressure at the side of said cut-off valve means; and
b. a quick supply valve means provided in said passage means between said cut-off valve means and said clutch actuating means for interrupting oil pressure being conveyed to said clutch actuating means when the oil pressure exceeds a predetermined value, said quick supply valve means being connected in parallel with said orifice valve means to allow oil pressure to be supplied to said clutch actuating means through said orifice upon establishment of said interruption; and branch oil passage means communicating said regulator valve means with said passage means at a point between said quick supply valve means and said clutch actuating means for bringing said passage means and said regulator valve means into fluid communication for controlling said regulator valve means in response to the oil pressure prevailing in said clutch actuator means.

3. A clutch oil pressure control arrangement as claimed in claim 2, further comprising an accumulator means provided in said passage means between the combination of said orifice valve means and said quick supply valve means and said clutch actuating means, for bringing clutch plates of the latter into their engaged position upon actuation of said quick supply valve means.

4. A clutch oil pressure control arrangement as claimed in claim 1, wherein said cut-off valve means comprises a solenoid adapted for being energized upon release of said accelerator pedal, and a valve for interrupting oil pressure supply to said clutch actuating means upon energization of said solenoid and for draining the oil pressure prevailing in said clutch-actuating means.

* * * * *